3,265,655
POLYVINYL ACETATE COMPOSITIONS

William F. Hill, Jr., South Charleston, W. Va., assignor to Union Carbide Corporation, a corporation of New York
No Drawing. Filed Sept. 26, 1963, Ser. No. 311,649
3 Claims. (Cl. 260—29.6)

This application is a continuation-in-part of application Serial No. 766,188, filed October 9, 1958, by William F. Hill, Jr., and now abandoned.

This invention relates to novel polyvinyl acetate compositions and to methods for their preparation. In a particular aspect, this invention relates to plasticized polyvinyl acetate compositions which are capable of forming continuous, flexible coatings on substrates at room temperature when applied as aqueous dispersions.

Polyvinyl acetate aqueous dispersions find wide commercial application as inexpensive resin bases for paints, adhesives, sizes, caulking compounds, paper coatings, and the like. When polyvinyl acetate dispersions are applied to substrates at room temperature, they form non-homogeneous films which must be baked to make them continuous and flexible or they form homogeneous films that are lacking in strength. Solvents and filming aids such as dibutyl phthalate can be employed to promote good film formation but they sometimes tend to coagulate the dispersed polyvinyl acetate, and they volatilize out of applied coatings over a period of time. Further, it is inconvenient to transport and store commercial polyvinyl acetate aqueous dispersions in their latex form because latex materials require certain precautions in storing and handling, e.g., bulk storage tanks and drums and circulating pumps must be stainless steel or have a baked phenolic resin lining or glass lining because latices tend to coagulate when they contact steel or brass. Also, latices are not able to withstand prolonged heating and repeated freeze-thaw cycles.

It is an object of this invention to provide plasticized polyvinyl acetate compositions which can be handled and stored as dry-blends without being affected by adverse conditions and which can be readily dispersed in an aqueous vehicle.

It is another object of this invention to provide aqueous polyvinyl acetate dispersion compositions which form continuous, flexible coatings on substrates at room temperature.

Other objects and advantages of this invention will become apparent from the accompanying description and disclosure.

Accordingly, this invention provides compositions comprising polyvinyl acetate and a water-soluble organic compound having a melting point above about 35° C. selected from the group consisting of aliphatic and aromatic carboxylic acids, amides, imides, carbamates and nitriles.

By the term "water-soluble" compound is meant a solid compound having a solubility of at least 0.1 part by weight in 100 parts of water at a temperature in the range between about 25° C. to 35° C. The water-soluble compounds preferred are those which have a solubility of at least 4 parts by weight in 100 parts of water at temperatures around room temperature (about 25° C.). The water-soluble, solid compounds act as a "plasticizer" or "semi-solvent" for polyvinyl acetate in aqueous dispersion compositions.

The water-soluble compounds, i.e., "solid plasticizers," having a melting point above about 35° C. contemplated to be employed in the compositions include unsaturated monobasic carboxylic acids such as crotonic acid, dimethylacrylic acid, angelic acid, tiglic acid, mandelic acid, sorbic acid, and the like, containing between four and about eight carbon atoms; saturated dibasic carboxylic acids such as malonic acid, glutaric acid, glutamic acid, azelaic acid, malic acid, tartaric acid, and the like, containing between three and about ten carbon atoms; unsaturated dibasic carboxylic acids such as maleic acid, fumaric acid, mesaconic acid, citraconic acid, glutaconic acid, itaconic acid, and the like, containing between four and about ten carbon atoms; tribasic carboxylic acids such as tricarballylic acid, aconitic acid, citric acid, 1,2,4-butanecarboxylic acid, and the like, containing between five and about ten carbon atoms; mono-amides such as acetamide, acrylamide, crotonamide, methylethylacetamide, isovaleramide, heptamide, and the like, containing between two and about eight carbon atoms; polyamides such as succinamide, maleamide, adipamide, and the like, containing between three and about eight carbon atoms; saturated and unsaturated imides such as succinimide, maleimide, parabanic acid, and the like, containing between four and about eight carbon atoms; carbamates such as methyl carbamate, ethyl carbamate, n-propyl carbamate, ethyl phenylcarbamate, and the like, containing between two and about ten carbon atoms; and nitriles such as malonitrile, succinonitrile, tricyanoethyl amine, and the like, containing between three and about ten carbon atoms.

The particularly preferred water-soluble, solid plasticizers of the above classes to be employed in the compositions of this invention are malonic acid, acetamide, succinimide, succinonitrile, ethyl carbamate and acrylamide. These preferred solid plasticizers are inexpensive and readily available and produce excellent results.

The polyvinyl acetate resins which are commercially available under a variety of trade-names can be employed as the resinous component of the compositions. The polyvinyl acetate resins preferred are those which have a "resin grade value" in the range between about 2 and 10, and are in a finely-divided state with a particle size between about $0.2\mu$ and $20\mu$.

By the term "resin grade value" is meant a value expressed as viscosity in centipoises ($\eta_{cps}$) which is defined by the following equation:

$$\eta_{cps} = Cgt - \frac{Bg}{t}$$

wherein C and B are constants for the specific Ubbelohde viscometer employed; $g$ is the specific gravity at 20° C. of the "grade" solution; and $t$ is the effluent time in seconds of the "grade" solution.

The term "grade solution" refers to the following proportion of components:

|  | Parts |
|---|---|
| Resin | 2 |
| Water | 5 |
| Dimethylformamide | 93 |

Polyvinyl acetate resins can be conveniently produced in aqueous emulsion systems by polymerizing vinyl acetate at a temperature between about 50° C. and 100° C. in the presence of a peroxide catalyst such as acetyl peroxide, benzoyl peroxide or hydrogen peroxide. Emulsifying agents and stabilizing agents are usually included in the polymerization systems, as well as various other materials such as formic acid, sodium vinyl sulfonate, lauryl mercaptan, sodium bisulfite, and the like, which serve as initiators or modifiers.

The preparation of polyvinyl acetate in emulsion polymerization systems is especially advantageous as compared to solution systems because the aqueous dispersed resin product mixtures that are recovered can be employed directly to prepare compositions of this invention. These compositions are prepared by the simple expediency of mixing together the aqueous dispersion of polyvinyl acetate with ethyl carbamate or one of the other members of the previously described group of water-soluble, solid plasticizers having a melting point above about 35° C.

Aqueous dispersions of polyvinyl acetate produced in emulsion polymerization systems are also useful in the practice of this invention for providing solid compositions which can be conveniently stored and handled. The polyvinyl acetate aqueous dispersions are spray-dried and then mixed with one of the solid plasticizers described above. These plasticized solid, polyvinyl acetate compositions are readily dispersable in water, and the resulting dispersions form continuous, flexible films when applied to substrates at room temperature, e.g., at a temperature of about 25° C., in the same manner as the compositions prepared by mixing a solid plasticizer with emulsion polymerization latex product mixtures.

The quantity of water-soluble organic compounds employed in the compositions can vary over a wide weight range depending on such factors as the particle size of the polyvinyl acetate, the degree of solubility of the particular plasticizer in water, and the degree of flexibility desired in the product. Generally, a quantity of water-soluble plasticizer is employed which is in the range between about 5 and 60 percent or more by weight, based on the weight of polyvinyl acetate in the compositions. The preferred compositions for obtaining relatively tack-free films are prepared with between about 5 and 30 percent by weight of water-soluble plasticizer based on the weight of polyvinyl acetate. The weight of polyvinyl acetate resin contained in aqueous dispersions can be varied over a broad range depending on the particle size of the resin and on the dispersion viscosity desired for a particular application, and other such considerations. Generally, the dispersed polyvinyl acetate will vary between about 40 and 60 percent by weight, based on the total weight of the composition.

One of the commercial polyvinyl acetate resins (Bakelite, vinyl resin latex WC–130) useful for the preparation of the compositions of this invention has as typical properties a total solids content (percent) of 58.5±1.5, a viscosity, centipoise (Brookfield) of 1,500 to 2,500, a pH of 4.5±0.5, a specific gravity of 1.104, and an average weight per gallon (lbs.) of 9.2.

The compositions of this invention can contain pigments and fillers or they can be utilized without such materials to produce clear coatings on a variety of substrates. The compositions can be premixed with dry pigments and fillers and subsequently mixed with water to form valuable coating materials. The compositions can be applied by all the conventional methods such as spraying, dipping, brushing, roll-coating, or knife-coating. The compositions find utility in exterior and interior house paints for wood and masonry surfaces, textile coatings and sizes, paper coatings, beater additives in papermaking, adhesives, caulking and patching compounds, joint cements for dry-wall construction, and other such uses.

An outstanding advantage of the compositions of this invention is that they form continuous, flexible films when applied with an aqueous vehicle at room temperature. Without the benefit of the water-soluble, solid plasticizers described herein, aqueous dispersions of polyvinyl acetate form nonhomogeneous films on surfaces at room temperature. Liquid solvents and plasticizers generally are unsatisfactory for aiding in the formation of continuous films since liquid solvents and plasticizers are continuously released from polyvinyl acetate film which causes the ultimate formation of a hard, inflexible material. Further, solid plasticizers have advantage over liquid plasticizers in that they can be mixed with powdered polyvinyl acetate and transported and stored as dry compositions which are dispersable in water for application purposes. A still further advantage of solid, water-soluble plasticizers over liquid, water-insoluble plasticizers is that no aging period is required, e.g., a period of six hours or more, when the plasticizer is incorporated into the compositions.

The following examples will serve to illustrate specific embodiments of the invention.

Example 1

To 50 grams of polyvinyl acetate resin latex (WC–130, 58.9 percent total solids, Bakelite) there was added 25 grams of a solution composed of 15 grams of acetamide and 10 grams of distilled water. After the ingredients were thoroughly mixed, a film was cast on glass at room temperature and after it was air-dried, a clear, continuous, flexible coating was produced.

Example 2

In the manner of Example 1, acetamide was added to the polyvinyl acetate latex at a concentration of 5 percent by weight, based on the weight of resin. The mixture was cast on glass and a continuous, flexible coating was obtained at room temperature.

The procedure was repeated employing a concentration of 17 percent by weight of acetamide, based on the weight of resin. The latex mixture was cast on glass and a continuous, flexible coating was obtained at room temperature.

Example 3

To a portion of finely-divided polyvinyl acetate powder* there was added 10 percent by weight of acetamide, based on the weight of resin, to form a uniform mixture. A quantity of distilled water was added with stirring to yield a dispersion of 50 percent solids content. The dispersion was cast on glass and a clear, continuous, flexible coating was obtained at room temperature.

Example 4

In the manner of Example 1, ethyl carbamate was added to the latex at a concentration of 5 percent by weight, based on the weight of resin. A coating of the latex composition air-dried at room temperature was clear, continuous and flexible.

Example 5

In the manner of Example 1, succinimide was added to the latex at a concentration of 10 percent by weight, based on the weight of resin. A coating of the latex composition air-dried at room temperature was clear, continuous and flexible.

Example 6

In the manner of Example 1, succinonitrile was added to the latex at a concentration of 10 percent by weight, based on the weight of resin. An air-dried coating of the latex composition on glass was clear, continuous and flexible.

Example 7

In the manner of Example 1, malonic acid was added to the latex at a concentration of 10 percent by weight, based on the weight of resin. A coating of the latex composition air-dried at room temperature was clear, continuous and flexible.

Example 8

In the manner of Example 3, there was added 5 percent by weight, based on the weight of finely-divided resin, of ethyl carbamate. A continuous coating was produced when an aqueous dispersion of the composition was cast on glass and air-dried at room temperature.

Example 9

In the manner of Example 3, 10 percent by weight of succinimide, based on the weight of resin, was added to the finely-divided resin powder. A clear, continuous flexible coating was produced when an aqueous dispersion

---

*Average particle size of approximately $20\mu$. Composition of 97.5% polyvinyl acetate, 1.5% water, and 1.0% of the potassium salt of a polyvinylmethyl ether-maleic anhydride copolymer (specific viscosity of 0.8–1.2).

of the composition was cast on glass and air-dried at room temperature.

*Example 10*

In the manner of Example 1, acetamide was added to portions of the latex at concentrations of 5 percent, 10 percent, 15 percent and 30 percent by weight, respectively, based on the weight of resin. Coatings of the compositions air-dried at room temperature were continuous and flexible. Each of the coatings remained flexible when aged at room temperature for several weeks.

*Example 11*

In the manner of Example 1, tricyanoethyl amine was added to portions of the latex at concentrations of 10 percent and 20 percent by weight, respectively, based on the weight of resin. Coatings of the compositions air-dried at room temperature were continuous and flexible.

*Example 12*

In the manner of Example 1, the solid plasticizers tabulated below were added to the latex at concentrations of 5 percent and 10 percent by weight, respectively, based on the weight of resin. Films of the compositions were cast and air-dried at room temperature on tin foil. The tin foil was removed by an amalgamating process and the unsupported resin films were used for tensile strength determinations.

|  | Tensile, lbs./in.$^2$ | Percent Elongation at Break |
|---|---|---|
| Control Film (without solid plasticizer) | 475 | 0 |
| Ethyl Carbamate: |  |  |
| 5% | 2,200 | 105 |
| 10% | 1,880 | 280 |
| Acetamide: |  |  |
| 5% | 870 | 75 |
| 10% | 830 | 5 |
| Succinimide: |  |  |
| 5% | 2,830 | 25 |
| 10% | 2,335 | 165 |
| Succinonitrile: |  |  |
| 5% | 2,600 | 120 |
| 10% | 1,880 | 295 |
| Malonic Acid: |  |  |
| 5% | 3,000 | 80 |
| 10% | 1,900 | 300 |
| Tricyanoethyl Amine: |  |  |
| 5% | 4,065 | 20 |
| 10% | 2,330 | 130 |

*Example 13*

| Components: | Percent by weight |
|---|---|
| Water | 26.50 |
| Tamol 731 (25% N.V.*)[1] | 0.53 |
| Sodium hydroxide (10% N.V.) | 0.34 |
| 4031-72-A (10% N.V.)[2] | 2.52 |
| Hubers X-43 [3] | 24.60 |
| Atomite [4] | 12.30 |
| Titanium dioxide | 12.30 |
| Foamex [5] | 0.01 |
| WC-130 (Bakelite polyvinyl acetate latex) | 12.30 |
| Acetamide (50% N.V.) | 8.60 |
| TS=61.1% N.V. |  |

*Non-volatiles.
[1] Sodium salt of carboxylated polyelectrolyte.
[2] Sodium dispersion of alpha protein.
[3] China clay.
[4] Calcium carbonate.
[5] Modified alkyl esters; specific gravity 25/25° C., 0.96–0.97.

The clay was slurried into water and half of the Tamol 731 and all of the sodium hydroxide was added. The pigments and the remaining portion of Tamol 731 were then stirred into the mixture. This was followed by the addition of the protein dispersion and the Foamex and the mixture was stirred for thirty minutes. Then the latex and the acetamide solution were added and the total mixture was stirred until smooth.

The composition was applied to a substrate and force-dried for one minute at a temperature of 93° C. The resulting coating exhibited excellent scrub resistance (no film removal at 2,000 scrub cycles), and no film was removed when a piece of Scotch tape was pressed down on the coating and quickly lifted.

*Example 14*

In the manner of Example 3, acrylamide was added to the finely-divided polyvinyl acetate resin powder at a concentration of 5 percent by weight, based on the weight of resin, and blended to form a uniform mixture. Distilled water was then added to this mixture with stirring to form an aqueous dispersion of 45 percent solids content. The dispersion was cast on glass and a clear, continuous, flexible coating was obtained at room temperature.

The above procedure was repeated employing a concentration of 10 percent by weight of acrylamide, based on the weight of finely-divided polyvinyl acetate resin. A clear, continuous, flexible coating was produced when an aqueous dispersion of the composition, of 45 percent solids content, was cast on glass and air-dried at room temperature.

What is claimed is:

1. A substantially dry blend composition capable of forming continuous, flexible coatings on substrates at room temperature when applied as an aqueous dispersion which consists essentially of finely-divided polyvinyl acetate and in admixture therewith about 5 to about 60 weight percent, based on the weight of polyvinyl acetate, of acrylamide.

2. A substantially dry blend composition capable of forming continuous, flexible coatings on substrates at room temperature when applied as an aqueous dispersion which consists essentially of finely-divided polyvinyl acetate and in admixture therewith about 5 to about 30 percent, based on the weight of polyvinyl acetate, of acrylamide.

3. A process for producing plasticized polyvinyl acetate compositions capable of forming continuous, flexible coatings on substrates at room temperature which consists essentially of dispersing in an inert aqueous vehicle a substantially dry blend composition consisting essentially of finely-divided polyvinyl acetate and in admixture therewith about 5 to about 60 weight percent, based on the weight of polyvinyl acetate, of acrylamide.

References Cited by the Examiner

UNITED STATES PATENTS 2,595,955  5/1952  Kunze et al. _____ 260—32.6
2,876,205  3/1959  Lightipe et al. _____ 260—32.6

FOREIGN PATENTS 764,299  12/1956  Great Britain.

MURRAY TILLMAN, *Primary Examiner.*

W. J. BRIGGS, SR., *Assistant Examiner.*